US012567816B2

(12) United States Patent
Shiraishi et al.

(10) Patent No.: US 12,567,816 B2
(45) Date of Patent: Mar. 3, 2026

(54) VEHICLE ON-BOARD POWER CONVERSION DEVICE

(71) Applicant: KABUSHIKI KAISHA TOYOTA JIDOSHOKKI, Aichi-ken (JP)

(72) Inventors: Kazuhiro Shiraishi, Kariya (JP); Keiji Yashiro, Kariya (JP); Shinji Kawahara, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 199 days.

(21) Appl. No.: 18/595,560

(22) Filed: Mar. 5, 2024

(65) Prior Publication Data

US 2024/0313668 A1     Sep. 19, 2024

(30) Foreign Application Priority Data

Mar. 17, 2023     (JP) ................................. 2023-043136

(51) Int. Cl.
*H02M 7/5387*          (2007.01)
*B60L 50/51*           (2019.01)
*H02M 1/00*            (2006.01)

(52) U.S. Cl.
CPC ......... *H02M 7/53873* (2013.01); *B60L 50/51* (2019.02); *H02M 1/0009* (2021.05); *B60L 2210/42* (2013.01)

(58) Field of Classification Search
CPC . H02M 7/53873; H02M 1/0009; B60L 50/51; B60L 2210/42
See application file for complete search history.

(56) References Cited

U.S. PATENT DOCUMENTS

| | | | |
|---|---|---|---|
| 2019/0089243 A1* | 3/2019 | Naito ..................... | H02M 1/126 |
| 2020/0298654 A1* | 9/2020 | Kagawa ............. | B60H 1/00642 |
| 2020/0309107 A1* | 10/2020 | Kinoshita ............... | F04B 35/04 |
| 2021/0231115 A1* | 7/2021 | Naito .................... | F04B 39/121 |

FOREIGN PATENT DOCUMENTS

| | | |
|---|---|---|
| JP | 2021-170907 | 10/2021 |

* cited by examiner

*Primary Examiner* — Rafael O De Leon De Domenech
(74) *Attorney, Agent, or Firm* — Greenblum & Bernstein, P.L.C.

(57)          ABSTRACT

A vehicle on-board power conversion device includes a power converter, a conversion device-side connector that is configured to be connected to an external connector, and a check circuit that is configured to check a connection state of the conversion device-side connector and the external connector. The power converter includes a microcontroller. The vehicle on-board power conversion device includes an isolator located between the check circuit and the micro-controller. The check circuit includes an inverting circuit that is configured to invert the signal including the square wave and generate an inverted wave. The microcontroller includes an output terminal configured to output a square wave, and a detection terminal configured to detect the square wave. The microcontroller determines whether there is an inter-terminal short-circuit anomaly based on a detection result of the detection terminal.

2 Claims, 3 Drawing Sheets

Fig.3

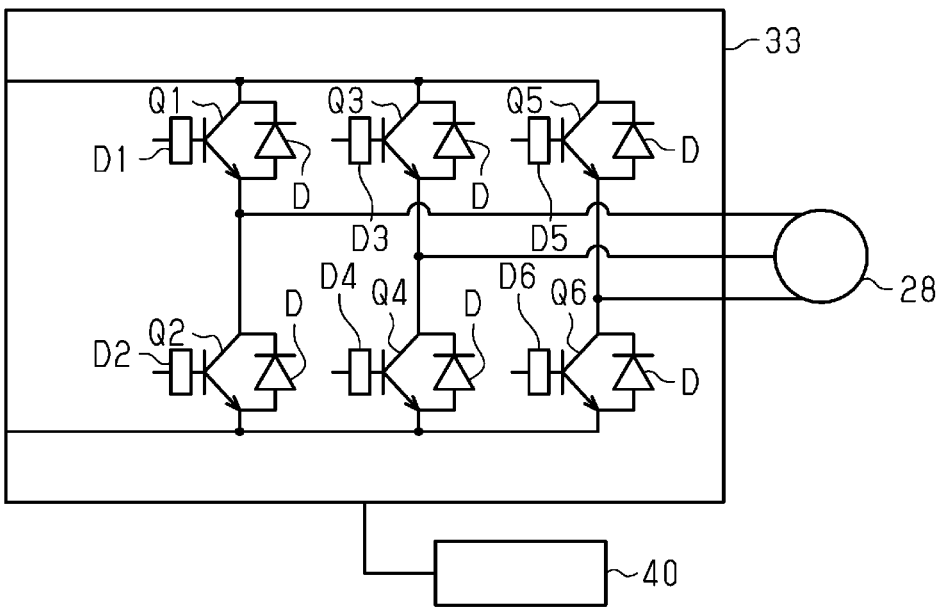

Fig.4

| State | Detection Result | | |
|---|---|---|---|
| | First Detection Terminal | Second Detection Terminal | Third Detection Terminal |
| Normal Connection | Square Wave (Inverted Wave) | Same as Output of Output Terminal | Same as Output of Output Terminal |
| Non-Connection Anomaly | High Level | Same as Output of Output Terminal | Same as Output of Output Terminal |
| Power Supply Short-Circuit Anomaly | Low Level | Same as Output of Output Terminal | Same as Output of Output Terminal |
| Ground Short-Circuit Anomaly | High Level | Low Level | Same as Output of Output Terminal |
| Output Anomaly | High Level or Low Level | Different from Output of Output Terminal | Different from Output of Output Terminal |
| Inter-Terminal Short-Circuit Anomaly | Square Wave (Non-Inverted Wave) | Same as Output of Output Terminal | Same as Output of Output Terminal |

VEHICLE ON-BOARD POWER CONVERSION DEVICE

BACKGROUND

1. Field

The present disclosure relates to a vehicle on-board power conversion device.

2. Description of Related Art

Japanese Laid-Open Patent Publication No. 2021-170907 discloses a vehicle on-board motor-driven compressor that includes a motor, an inverter circuit, a compressor-side connector, a check circuit, a microcontroller, and an insulation element. The compressor-side connector is connected to an external connector. The compressor-side connector is electrically connected to the external connector, so that the inverter circuit is connected to a high-voltage power supply. The inverter circuit changes DC power supplied from the high-voltage power supply to AC power and delivers the AC power to the motor. The check circuit checks a connection state of the compressor-side connector and the external connector. The check circuit is provided in a low-voltage circuit. The microcontroller is provided in a high-voltage circuit. The microcontroller includes an output terminal and a detection terminal. The microcontroller outputs a square wave from the output terminal to the check circuit. The microcontroller detects signals at the detection terminal. The microcontroller determines the connection state of the compressor-side connector and the external connector based on a signal detected at the detection terminal.

The insulation element transmits signals between the low-voltage circuit and the high-voltage circuit while maintaining insulation between the low-voltage circuit and the high-voltage circuit. The insulation element allows signals to be transmitted between the microcontroller, which is provided in the high-voltage circuit, and the check circuit, which is provided in the low-voltage circuit. In the above-described publication, a photocoupler is used as the insulation element.

An isolator may be used as an insulation element. The miniaturization of vehicle on-board power conversion devices has driven the demand for compact isolators. In such cases, there may be a need to detect whether there is a short circuit between terminals of the isolator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle on-board power conversion device includes a power converter, a case, a conversion device-side connector, and a check circuit. The power converter includes a switching element, a drive circuit that drives the switching element, and a microcontroller that controls the drive circuit. The power converter is configured to convert a power from a power supply using the switching element and supply the converted power to a load. The case accommodates the power converter. The conversion device-side connector is electrically connected to the power converter and is configured to be connected to an external connector electrically connected to the power supply. The check circuit is configured to check a connection state of the conversion device-side connector and the external connector. The microcontroller includes an output terminal configured to output a square wave, and a detection terminal configured to detect the square wave. The conversion device-side connector includes two checking terminals configured to be connected to a checking conductor provided in the external connector. The output terminal and the detection terminal are electrically connected to the check circuit together with the two checking terminals and the checking conductor. The vehicle on-board power conversion device further comprises an isolator located between the check circuit and the microcontroller. The isolator is configured to transmit a signal including the square wave while insulating the check circuit and the microcontroller from each other. The isolator includes a first terminal, a second terminal, a third terminal, and fourth terminal. The first terminal is electrically connected to the output terminal. The second terminal is electrically connected to the detection terminal. The third terminal is insulated from the first terminal and is electrically connected to a first checking terminal of the two checking terminals, and is configured to output the square wave transmitted from the first terminal. The fourth terminal is insulated from the third terminal and is electrically connected to a second checking terminal of the two checking terminals, and is configured to output the input square wave to the second terminal. The check circuit includes an inverting circuit located between the second checking terminal and the fourth terminal. The inverting circuit is configured to invert the signal including the square wave so as to generate an inverted wave. The microcontroller is configured to determine that the conversion device-side connector and the external connector are connected to each other when detecting the inverted wave at the detection terminal in response to the checking conductor electrically connecting the two checking terminals to each other. The microcontroller is also configured to determine whether there is any of multiple anomalies based on a detection result of the detection terminal. The anomalies include a non-connection anomaly, in which the conversion device-side connector and the external connector are not connected to each other, and an inter-terminal short-circuit anomaly, in which a short circuit is occurring between the first terminal and the second terminal or between the third terminal and the fourth terminal. The microcontroller is further configured to output an anomaly signal indicating which of the anomalies is occurring.

Other features and aspects will be apparent from the following detailed description, the drawings, and the claims.

BRIEF DESCRIPTION OF THE DRAWINGS

FIG. 3 is a circuit diagram showing an inverter circuit of the vehicle on-board power conversion device shown in FIG. 2.

FIG. 4 is a diagram showing a correspondence relationship between the state of the vehicle on-board power conversion device and detection results of detection terminals.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle on-board power conversion device 30 according to one embodiment will now be described.

Figure 1:
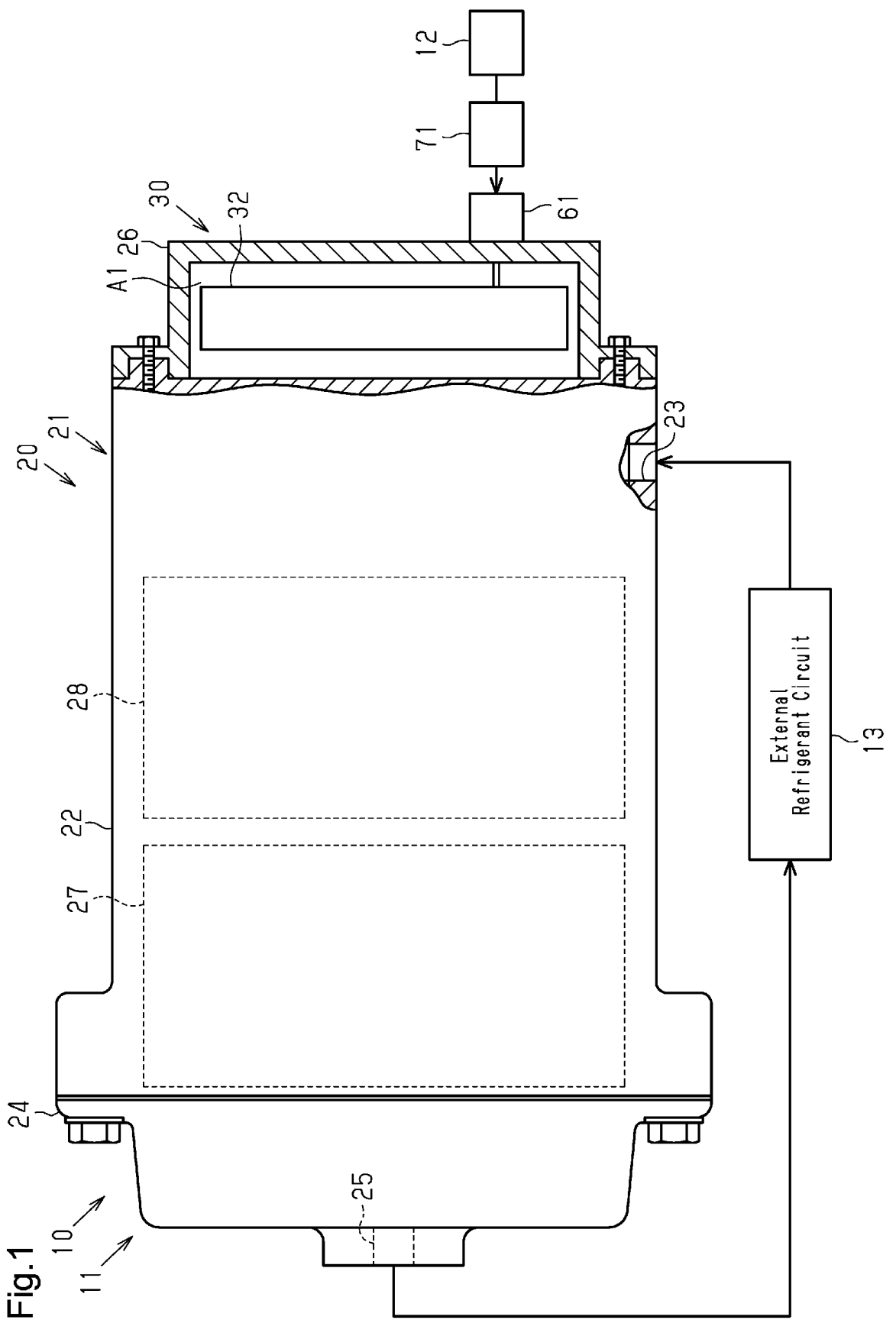
FIG. 1 is a cross-sectional view, with a part cut away, showing a vehicle on-board motor-driven compressor.

As shown in FIG. 1, a vehicle 10 includes a vehicle air conditioner 11, a high-voltage power supply 12, and an external connector 71. The vehicle air conditioner 11 includes an external refrigerant circuit 13 and a vehicle on-board motor-driven compressor 20. The external refrigerant circuit 13 supplies refrigerant to the vehicle on-board motor-driven compressor 20. The external refrigerant circuit 13 includes an evaporator, a condenser, and an expansion valve. The external refrigerant circuit 13 performs cooling and heating of the passenger compartment of the vehicle 10 by exchanging heat between the outside and the refrigerant.

Vehicle On-Board Motor-Driven Compressor

The vehicle on-board motor-driven compressor 20 includes a housing 21, a compression unit 27, which compresses refrigerant, a motor 28, and the vehicle on-board power conversion device 30.

The housing 21 includes a first housing member 22 and a second housing member 24. The first housing member 22 includes an inlet 23. The inlet 23 is connected to the external refrigerant circuit 13. The second housing member 24 is fixed to the first housing member 22. The second housing member 24 includes an outlet 25. The outlet 25 is connected to the external refrigerant circuit 13.

The compression unit 27 compresses refrigerant that has been drawn into the housing 21 through the inlet 23. The compressed refrigerant is discharged through the outlet 25. The compression unit 27 is, for example, a scroll type, a piston type, or a vane type. The motor 28 drives the compression unit 27. The motor 28 is a three-phase motor. The compression unit 27 and the motor 28 are accommodated in the first housing member 22. When driven by the motor 28, the compression unit 27 compresses refrigerant drawn in through the inlet 23 and discharges the compressed refrigerant through the outlet 25. The compression unit 27 does not necessarily need to be accommodated in the housing 21.

Vehicle On-Board Power Conversion Device

Figure 2:
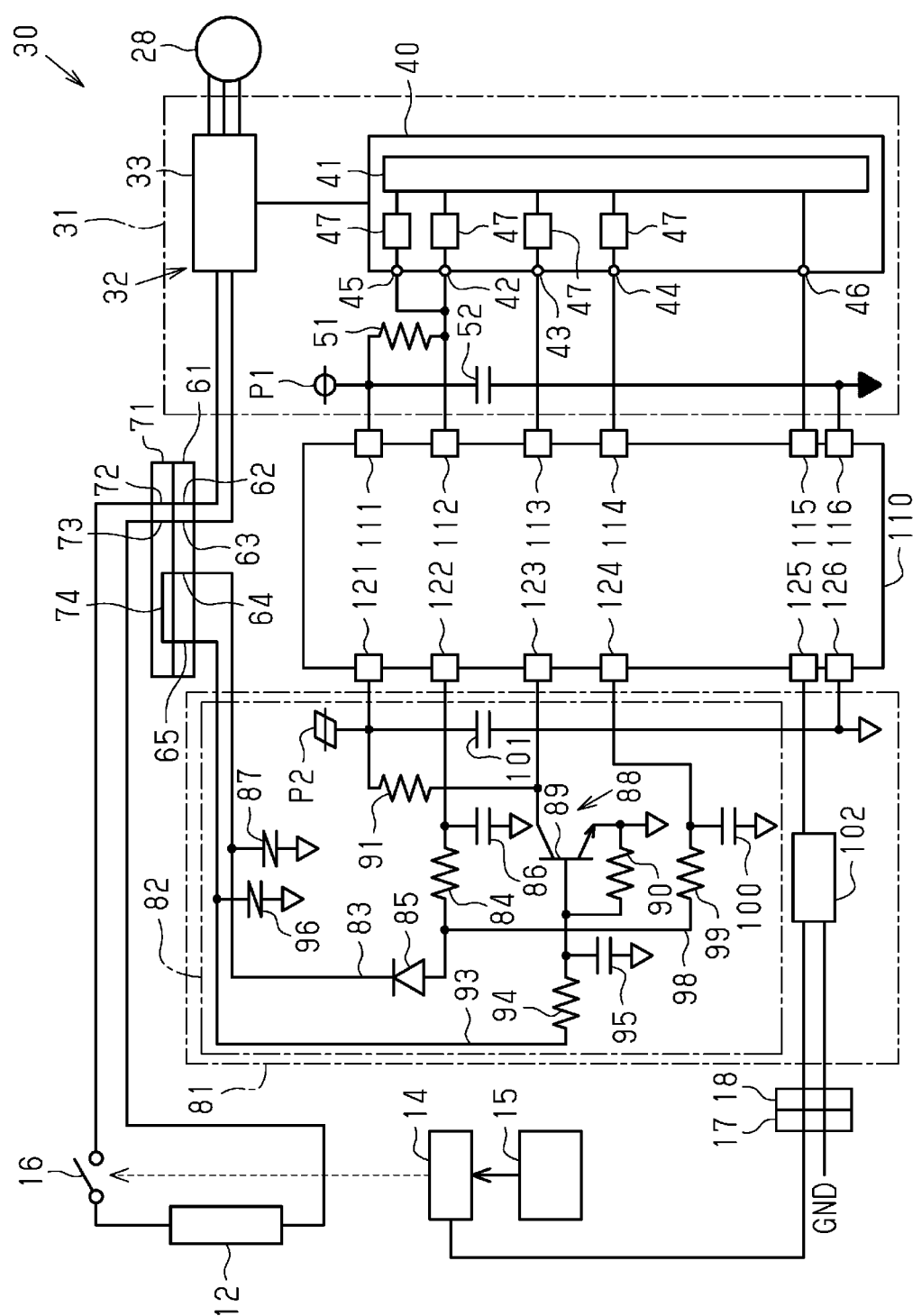
FIG. 2 is a circuit diagram showing a vehicle on-board power conversion device of the vehicle on-board motor-driven compressor shown in FIG. 1.

As shown in FIGS. 1 and 2, the vehicle on-board power conversion device 30 includes a case 26. The case 26 is fixed to the first housing member 22. The case 26 is fixed to the first housing member 22 to define an accommodation space A1.

As shown in FIG. 2, the vehicle on-board power conversion device 30 includes a high-voltage circuit 31 and a low-voltage circuit 81. Different voltages are applied to the high-voltage circuit 31 and the low-voltage circuit 81. For example, the high-voltage circuit 31 operates when receiving a voltage in a range of 400 V to 800 V from the high-voltage power supply 12. The low-voltage circuit 81 operates when receiving a voltage of 12 V or 24 V from a low-voltage power supply (not shown). The ground of the high-voltage circuit 31 and the ground of the low-voltage circuit 81 are insulated from each other.

The vehicle on-board power conversion device 30 includes an isolator 110. The isolator 110 includes a high-voltage-side power supply terminal 111, a first high-voltage-side signal terminal 112, a second high-voltage-side signal terminal 113, a third high-voltage-side signal terminal 114, a fourth high-voltage-side signal terminal 115, and a high-voltage-side ground terminal 116. The first high-voltage-side signal terminal 112 and the second high-voltage-side signal terminal 113 are arranged adjacent to each other. The first high-voltage-side signal terminal 112 is a first terminal. The second high-voltage-side signal terminal 113 is a second terminal.

The isolator 110 includes a low-voltage-side power supply terminal 121, a first low-voltage-side signal terminal 122, a second low-voltage-side signal terminal 123, a third low-voltage-side signal terminal 124, a fourth low-voltage-side signal terminal 125, and a low-voltage-side ground terminal 126. The first low-voltage-side signal terminal 122 and the second low-voltage-side signal terminal 123 are arranged adjacent to each other. The first low-voltage-side signal terminal 122 is insulated from the first high-voltage-side signal terminal 112. The second low-voltage-side signal terminal 123 is insulated from the first low-voltage-side signal terminal 122. The first low-voltage-side signal terminal 122 is a third terminal. The second low-voltage-side signal terminal 123 is a fourth terminal.

The high-voltage-side power supply terminal 111 is connected to a power supply P1 of the high-voltage circuit 31. The high-voltage-side ground terminal 116 is connected to the ground of the high-voltage circuit 31. The low-voltage-side power supply terminal 121 is connected to a power supply P2 of the low-voltage circuit 81. The low-voltage-side ground terminal 126 is connected to the ground of the low-voltage circuit 81.

The isolator 110 is an insulation element that transmits signals between the high-voltage circuit 31 and the low-voltage circuit 81 while maintaining insulation between the high-voltage circuit 31 and the low-voltage circuit 81. The isolator 110 transmits signals from the first high-voltage-side signal terminal 112 to the first low-voltage-side signal terminal 122. Thus, the first low-voltage-side signal terminal 122 outputs signals including square waves transmitted from the first high-voltage-side signal terminal 112. The isolator 110 transmits signals from the second low-voltage-side signal terminal 123 to the second high-voltage-side signal terminal 113. Thus, the second low-voltage-side signal terminal 123 outputs received signals including square waves to the second high-voltage-side signal terminal 113. The isolator 110 transmits signals from the third low-voltage-side signal terminal 124 to the third high-voltage-side signal terminal 114. The third high-voltage-side signal terminal 114 is a fifth terminal. The third low-voltage-side signal terminal 124 is insulated from the third high-voltage-side signal terminal 114. The third low-voltage-side signal terminal 124 transmits square waves output from the first low-voltage-side signal terminal 122 to the third highvoltage-side signal terminal 114. The third low-voltage-side signal terminal 124 is a sixth terminal. The isolator 110 transmits signals from the fourth high-voltage-side signal terminal 115 to the fourth low-voltage-side signal terminal 125. The isolator 110 may be of a magnetic coupling type or a capacitive coupling type. An isolator of a magnetic coupling type uses magnetic coupling of coils. An isolator of a capacitive coupling type uses capacitors.

The high-voltage circuit 31 includes a power converter 32. The power converter 32 is accommodated in the case 26. Specifically, the power converter 32 is accommodated in the accommodation space A1.

The power converter 32 includes an inverter circuit 33. The inverter circuit 33 is a three-phase inverter that changes DC power supplied from the high-voltage power supply 12 to AC power and outputs the AC power. The inverter circuit 33 and the motor 28 are electrically connected to each other. The motor 28 is a load.

As shown in FIG. 3, the inverter circuit 33 includes six switching elements Q1, Q2, Q3, Q4, Q5, Q6 and six drive circuits D1, D2, D3, D4, D5, D6.

The switching elements Q1 to Q6 are, for example, insulated gate bipolar transistors or MOSFETs. The switching elements Q1 to Q6 each include a diode D. The switching element Q1, which forms a U-phase upper arm, and the switching element Q2, which forms a U-phase lower arm, are connected in series. The switching element Q3, which forms a V-phase upper arm, and the switching element Q4, which forms a V-phase lower arm, are connected in series. The switching element Q5, which forms a W-phase upper arm, and the switching element Q6, which forms a W-phase lower arm, are connected in series. The nodes between the switching elements Q1, Q3, Q5, which form the upper arms, and the switching elements Q2, Q4, Q6, which form the lower arms, are connected to the motor 28 according to the respective phases. The power converter 32 converts power from the high-voltage power supply 12 using the switching elements Q1 to Q6 and supplies the power to the motor 28.

The drive circuits D1 to D6 are provided to respectively correspond to the switching elements Q1 to Q6. The drive circuits D1 to D6 each drive the corresponding one of the switching elements Q1 to Q6.

As shown in FIG. 2, the power converter 32 includes a microcontroller 40. The microcontroller 40 includes a processor 41. The processor 41 is, for example, a central processing unit (CPU), a graphics processing unit (GPU), or a digital signal processor (DSP).

The microcontroller 40 includes an output terminal 42, a first detection terminal 43, a second detection terminal 44, a third detection terminal 45, a communication terminal 46, and A/D conversion units 47. Each of the A/D conversion units 47 corresponds to a different one of the output terminal 42, the first detection terminal 43, the second detection terminal 44, and the third detection terminal 45. The processor 41 sets the electric potential of the output terminal 42 to a high level or a low level using the A/D conversion units 47. This allows the output terminal 42 to output square waves. The processor 41 determines whether the electric potentials of the first detection terminal 43, the second detection terminal 44, and the third detection terminal 45 are at a high level or a low level using the A/D conversion units 47. The first detection terminal 43, the second detection terminal 44, and the third detection terminal 45 detect the square wave output from the output terminal 42. The first detection terminal 43 is a detection terminal.

The output terminal 42 is electrically connected to the first high-voltage-side signal terminal 112. The first detection terminal 43 is electrically connected to the second high-voltage-side signal terminal 113. The second detection terminal 44 is electrically connected to the third high-voltage-side signal terminal 114. The third detection terminal 45 is electrically connected to the output terminal 42. The communication terminal 46 is electrically connected to the fourth high-voltage-side signal terminal 115.

The high-voltage circuit 31 includes a high-voltage-side resistance element 51. The high-voltage-side resistance element 51 is arranged between the power supply P1 and the output terminal 42. The high-voltage circuit 31 includes a high-voltage-side capacitor 52. The high-voltage-side capacitor 52 is provided between the power supply P1 and the high-voltage-side ground terminal 116.

The vehicle on-board power conversion device 30 includes a conversion device-side connector 61. The conversion device-side connector 61 includes a first connection terminal 62, a second connection terminal 63, and two checking terminals 64, 65. One of the two checking terminals 64, 65 will be referred to as a first checking terminal 64. One of the two checking terminals 64, 65 that is different from the first checking terminal 64 will be referred to as a second checking terminal 65. The first connection terminal 62 and the second connection terminal 63 are electrically connected to the inverter circuit 33. The conversion device-side connector 61 is thus electrically connected to the power converter 32. The conversion device-side connector 61 is connected to the external connector 71.

The external connector 71 includes a first external terminal 72, a second external terminal 73, and a checking conductor 74. The first external terminal 72 and the second external terminal 73 are electrically connected to the high-voltage power supply 12. The external connector 71 is thus electrically connected to the high-voltage power supply 12. When the external connector 71 is connected to the conversion device-side connector 61, the first external terminal 72 and the first connection terminal 62 are electrically connected to each other. When the external connector 71 is connected to the conversion device-side connector 61, the second external terminal 73 and the second connection terminal 63 are electrically connected to each other. Accordingly, DC power is supplied from the high-voltage power supply 12 to the inverter circuit 33. This allows the motor 28 to be driven. The first checking terminal 64 and the second checking terminal 65 can be connected to the checking conductor 74. When the external connector 71 is connected to the conversion device-side connector 61, the first checking terminal 64 and the second checking terminal 65 are electrically connected to the checking conductor 74. Accordingly, the first checking terminal 64 and the second checking terminal 65 are electrically connected to each other via the checking conductor 74.

The vehicle 10 includes a vehicle ECU 14, a power switch 15, a system main relay 16, a first communication connector 17, and a second communication connector 18. The vehicle ECU 14 is an electronic control unit (ECU) that controls the system main relay 16. When the power switch 15 is turned on, the vehicle ECU 14 closes the system main relay 16. When the power switch 15 is turned off, the vehicle ECU 14 opens the system main relay 16. The system main relay 16 is provided between the high-voltage power supply 12 and the external connector 71. The first communication connector 17 is connected to the vehicle ECU 14. The first communication connector 17 is connected to the second communication connector 18.

The low-voltage circuit 81 includes a check circuit 82. The check circuit 82 is used to check the connection state of the conversion device-side connector 61 and the external connector 71. The check circuit 82 includes a first connection line 83. The first connection line 83 connects the first checking terminal 64 and the first low-voltage-side signal terminal 122 to each other. Accordingly, the first low-voltage-side signal terminal 122 is electrically connected to the first checking terminal 64. The check circuit 82 includes a first low-voltage-side resistance element 84. The first low-voltage-side resistance element 84 is provided on the first connection line 83. The first low-voltage-side resistance element 84 is provided between the first checking terminal 64 and the first low-voltage-side signal terminal 122. The check circuit 82 includes a diode 85. The diode 85 is provided on the first connection line 83. The diode 85 is provided between the first checking terminal 64 and the first low-voltage-side resistance element 84. The anode of the diode 85 is connected to the first low-voltage-side resistance element 84. The cathode of the diode 85 is connected to the first checking terminal 64.

The check circuit 82 includes a first low-voltage-side capacitor 86. The first low-voltage-side capacitor 86 is provided between the first connection line 83 and the ground of the low-voltage circuit 81. The check circuit 82 includes a first varistor 87. The first varistor 87 is provided between the first connection line 83 and the ground of the low-voltage circuit 81.

The check circuit 82 includes an inverting circuit 88. The inverting circuit 88 includes a transistor 89. The transistor 89 is, for example, an NPN transistor. The collector of the transistor 89 is connected to the second low-voltage-side signal terminal 123. The emitter of the transistor 89 is connected to the ground of the low-voltage circuit 81. The inverting circuit 88 includes a second low-voltage-side resistance element 90. The second low-voltage-side resistance element 90 is provided between the base of the transistor 89 and the emitter of the transistor 89. The inverting circuit 88 includes a pull-up resistor 91. The pull-up resistor 91 connects the power supply P1 of the high-voltage circuit 31 to the collector of the transistor 89.

The check circuit 82 includes a second connection line 93. The second connection line 93 connects the second checking terminal 65 and the base of the transistor 89 to each other. The second connection line 93 and the transistor 89 electrically connect the second low-voltage-side signal terminal 123 to the second checking terminal 65. The inverting circuit 88 receives signals output by the first low-voltage-side signal terminal 122. The inverting circuit 88 inverts the low level and the high level of an input signal. The inverting circuit 88 outputs the inverted signal to the second low-voltage-side signal terminal 123. The inverting circuit 88 inverts the levels of signals including square waves between the second checking terminal 65 and the second low-voltage-side signal terminal 123. The check circuit 82 includes a third low-voltage-side resistance element 94. The third low-voltage-side resistance element 94 is provided on the second connection line 93. The third low-voltage-side resistance element 94 is connected to the base of the transistor 89. The check circuit 82 includes a second low-voltage-side capacitor 95. The second low-voltage-side capacitor 95 is provided between the second connection line 93 and the ground of the low-voltage circuit 81. The check circuit 82 includes a second varistor 96. The second varistor 96 is provided between the second connection line 93 and the ground of the low-voltage circuit 81.

The check circuit 82 includes a third connection line 98. The third connection line 98 connects the third low-voltage-side signal terminal 124 to a section of the first connection line 83 between the diode 85 and the first low-voltage-side resistance element 84. The check circuit 82 includes a fourth low-voltage-side resistance element 99. The fourth low-voltage-side resistance element 99 is provided on the third connection line 98. Signals output from the first low-voltage-side signal terminal 122 are input to the third low-voltage-side signal terminal 124 via the third connection line 98. Accordingly, the second detection terminal 44 receives signals that have not passed through the inverting circuit 88. Specifically, a square wave passing through the isolator 110 is divided between the first low-voltage-side signal terminal 122 and the first checking terminal 64, and is input to the second detection terminal 44 without passing through the inverting circuit 88. The fourth low-voltage-side resistance element 99 is provided between the third low-voltage-side signal terminal 124 and a section of the first connection line 83 between the diode 85 and the first low-voltage-side resistance element 84. The check circuit 82 includes a third low-voltage-side capacitor 100. The third low-voltage-side capacitor 100 is provided between the third connection line 98 and the ground of the low-voltage circuit 81.

The check circuit 82 includes a fourth low-voltage-side capacitor 101. The fourth low-voltage-side capacitor 101 is provided between the power supply P2 of the low-voltage circuit 81 and the low-voltage-side ground terminal 126. The isolator 110 is electrically connected between the check circuit 82 and the microcontroller 40. The isolator 110 transmits signals including square waves while insulating the check circuit 82 and the microcontroller 40 from each other.

The output terminal 42 and the first detection terminal 43 are electrically connected to the check circuit 82, which checks the connection state of the conversion device-side connector 61 and the external connector 71, together with the checking terminals 64, 65 and the checking conductor 74.

The low-voltage circuit 81 includes a communication unit 102. The communication unit 102 is a transceiver that allows the vehicle ECU 14 and the microcontroller 40 to communicate with each other. The communication unit 102 is connected to the second communication connector 18. The communication unit 102 is connected to the fourth low-voltage-side signal terminal 125.

Operation of Present Embodiment

Operation of the present embodiment will now be described together with control executed by the microcontroller 40.

When the power switch 15 is turned on in a state in which the external connector 71 is attached to the conversion device-side connector 61, the system main relay 16 is closed. This electrically connects the high-voltage power supply 12 and the inverter circuit 33 to each other. The microcontroller 40 diagnoses the state of the vehicle on-board power conversion device 30. The state of the vehicle on-board power conversion device 30 to be diagnosed includes the connection state of the connectors and the state of the check circuit 82. The connection state of the connectors refers to the connection state of the external connector 71 and the conversion device-side connector 61.

As shown in FIG. 4, the connection state of the connectors includes a normal connection and a non-connection anomaly. The state of the check circuit 82 includes a power supply short-circuit anomaly, a ground short-circuit anomaly, an output anomaly, and an inter-terminal short-circuit anomaly.

The normal connection refers to a state in which the external connector 71 is attached to the conversion device-side connector 61 such that the external connector 71 and the conversion device-side connector 61 are normally connected. Specifically, the normal connection refers to a state in which the first external terminal 72 and the first connection terminal 62 are electrically connected to each other, and the second external terminal 73 and the second connection terminal 63 are electrically connected to each other.

The non-connection anomaly, the ground short-circuit anomaly, the output anomaly, and the inter-terminal short-circuit anomaly are anomalies in the vehicle on-board power conversion device 30. The non-connection anomaly refers to a state in which the external connector 71 and the conversion device-side connector 61 are not connected to each other. The power supply short-circuit anomaly is a state in which the check circuit 82 is short-circuited with the power supply that applies voltage to the power converter 32. The ground short-circuit anomaly refers to a state in which the check circuit 82 is short-circuited with the ground of the power converter 32. The output anomaly refers to a state in which signals output from the output terminal 42 are abnormal. The inter-terminal short-circuit anomaly refers to a state in which a short circuit is occurring between the first low-voltage-side signal terminal 122 and the second low-voltage-side signal terminal 123 or between the first high-voltage-side signal terminal 112 and the second high-voltage-side signal terminal 113.

The microcontroller 40 determines whether the non-connection anomaly, the power supply short-circuit anomaly, the ground short-circuit anomaly, the output anomaly, or the inter-terminal short-circuit anomaly is occurring. The microcontroller 40 outputs a signal indicating which of the anomalies is occurring as an anomaly signal. The anomaly signal is input to the vehicle ECU 14 via the communication unit 102. When receiving the anomaly signal, the vehicle ECU 14 performs warning. The warning is performed, for example, by lighting a lamp or activating a buzzer.

When determining the connection state of the connectors and the state of the check circuit 82, the microcontroller 40 outputs a square wave from the output terminal 42. A square wave is a signal in which high-level signals and low-level signals are switched periodically. When outputting a square signal from the output terminal 42, the microcontroller 40 determines the connection state of the connectors and the state of the check circuit 82 based on detection results at the first detection terminal 43, the second detection terminal 44, and the third detection terminal 45. The detection results at the first detection terminal 43, the second detection terminal 44, and the third detection terminal 45 refer to the types of signals detected at the first detection terminal 43, the second detection terminal 44, and the third detection terminal 45.

Normal Connection

When the connection state of the connectors is the normal connection, the first detection terminal 43 detects an inverted square wave of the square wave output from the output terminal 42. The inverted square wave of the square wave output from the output terminal 42 is referred to as an inverted wave. The inverted wave is a signal obtained by inverting high-level signals and low-level signals in the square wave output by the output terminal 42. That is, when the square wave output by the output terminal 42 is at a high level, the inverted wave is at a low level. When the square wave output by the output terminal 42 is at a low level, the inverted wave is at a high level.

When the connection state of the connectors is the normal connection, the first checking terminal 64 and the second checking terminal 65 are electrically connected to each other via the checking conductor 74. When the output terminal 42 outputs a square wave, the square wave is input to the inverting circuit 88 via the isolator 110, the first checking terminal 64, the checking conductor 74, and the second checking terminal 65. When the square wave is input to the inverting circuit 88, the high level and the low level are inverted. Accordingly, the inverting circuit 88 outputs the inverted wave to the second low-voltage-side signal terminal 123. The inverted wave input to the second low-voltage-side signal terminal 123 is output from the second high-voltage-side signal terminal 113. Accordingly, the first detection terminal 43 detects the inverted wave.

In a case in which the connection state of the connectors is the normal connection, the same signal as the output of the output terminal 42 is detected at the second detection terminal 44 and the third detection terminal 45. That is, a square wave that is obtained by not inverting the square wave output by the output terminal 42 is detected at the second detection terminal 44 and the third detection terminal 45. The square wave obtained by not inverting the square wave output from the output terminal 42 is referred to as a non-inverted wave. When the output terminal 42 outputs a square wave, the square wave is input to the third low-voltage-side signal terminal 124 via the third connection line 98. Since the third connection line 98 electrically connects the first low-voltage-side signal terminal 122 and the third low-voltage-side signal terminal 124 to each other without the inverting circuit 88 in between, the third low-voltage-side signal terminal 124 receives the square wave output by the output terminal 42. The square wave input to the third low-voltage-side signal terminal 124 is output from the third high-voltage-side signal terminal 114 to the second detection terminal 44. Accordingly, a non-inverted wave is detected at the second detection terminal 44. Since the third detection terminal 45 is connected to the output terminal 42, the square wave output from the output terminal 42 is input to the third detection terminal 45. Accordingly, a non-inverted wave is detected at the third detection terminal 45. When the checking conductor 74 electrically connects the checking terminals 64, 65 to each other so that an inverted wave is detected at the first detection terminal 43, the microcontroller 40 determines that the connection state of the connectors is the normal connection. The microcontroller 40 may determine that the connection state of the connectors is the normal connection when detecting an inverted wave at the first detection terminal 43 and a non-inverted wave at the second detection terminal 44.

As described above, the microcontroller 40 determines that the conversion device-side connector 61 and the external connector 71 are normally connected to each other when the checking conductor 74 electrically connects the two checking terminals 64, 65 to each other, and the microcontroller 40 detects, at the first detection terminal 43, a square wave that has been output from the output terminal 42 and inverted by the inverting circuit 88.

Non-Connection Anomaly

When the connection state of the connectors is the non-connection anomaly, the first detection terminal 43 detects only high-level signals. When the connection state of the connectors is the non-connection anomaly, the first checking terminal 64 and the second checking terminal 65 are not electrically connected to each other. If the output terminal 42 outputs a square wave, the square wave is not input to the inverting circuit 88. The second low-voltage-side signal terminal 123 receives only high-level signals from the pull-up resistor 91. Thus, when the connection state of the connectors is the non-connection anomaly, the first detection terminal 43 detects only high-level signals. In a case in which the connection state of the connectors is the non-connection anomaly, the same signal as the output of the output terminal 42 is detected at the second detection terminal 44 and the third detection terminal 45. When the output terminal 42 outputs a square wave, the square wave is input to the third low-voltage-side signal terminal 124 via the third connection line 98. Since the third connection line 98 electrically connects the first connection line 83 to the third low-voltage-side signal terminal 124, the third connection line 98 transmits a square wave to the third low-voltage-side signal terminal 124 regardless of the connection state of the connectors. Accordingly, a non-inverted wave is detected at the second detection terminal 44. Since the third detection terminal 45 is connected to the output terminal 42, the square wave output from the output terminal 42 is input to the third detection terminal 45. Accordingly, a non-inverted wave is detected at the third detection terminal 45. When detecting only high-level signals at the first detection terminal 43, the microcontroller 40 determines that the connection state of the connectors is the non-connection anomaly. The microcontroller 40 may determine that the connection state of the connectors is the non-connection anomaly when detecting only high-level signals at the first detection terminal 43 and a non-inverted wave at the second detection terminal 44.

Power Supply Short-Circuit Anomaly

When the state of the check circuit 82 is the power supply short-circuit anomaly, the first detection terminal 43 detects only low-level signals. When the power supply short-circuit anomaly occurs, the voltage applied by the high-voltage power supply 12 or the low-voltage power supply causes current to flow through the second connection line 93. Since the second connection line 93 is maintained at the high level, the output of the inverting circuit 88 is maintained at the low level. Accordingly, the first detection terminal 43 always receives low-level signals. Even if the power supply short-circuit anomaly occurs, the diode 85 prevents current from flowing to the third low-voltage-side signal terminal 124. Therefore, when the state of the check circuit 82 is the power supply short-circuit anomaly, the same signal as the output of the output terminal 42 is detected at the second detection terminal 44. Since the third detection terminal 45 is connected to the output terminal 42, the square wave output from the output terminal 42 is input to the third detection terminal 45. Accordingly, a non-inverted wave is detected at the third detection terminal 45. When detecting only low-level signals at the first detection terminal 43 and a non-inverted wave at the second detection terminal 44, the microcontroller 40 determines that the connection state of the check circuit 82 is the power supply short-circuit anomaly.

Ground Short-Circuit Anomaly

When the state of the check circuit 82 is the ground short-circuit anomaly, the first detection terminal 43 detects only high-level signals. Even if the first detection terminal 43 outputs a square wave when the ground short-circuit anomaly occurs, the square wave is not input to the inverting circuit 88. That is, the first connection line 83 and the second connection line 93 are maintained at the low level. Since the output of the inverting circuit 88 is maintained at the high level, the first detection terminal 43 detects only high-level signals. When the ground short-circuit anomaly occurs, the first connection line 83 and the second connection line 93 are maintained at the low level. Thus, even if the output terminal 42 outputs high-level signals, current flows to the ground via the first connection line 83 and the second connection line 93. Since the third low-voltage-side signal terminal 124 does not receive high-level signals, the second detection terminal 44 detects only low-level signals. The same signal as the output of the output terminal 42 is detected at third detection terminal 45. When detecting only high-level signals at the first detection terminal 43 and only low-level signals at the second detection terminal 44, the microcontroller 40 determines that the state of the check circuit 82 is the ground short-circuit anomaly.

Output Anomaly

When the state of the check circuit 82 is the output anomaly, the first detection terminal 43 detects signals different from those in a square wave, that is, only high-level signals or low-level signals. When the state of the check circuit 82 is the output anomaly, the output terminal 42 outputs signals different from those in a square wave, that is, only high-level signals or low-level signals, so that no square wave is output, even though the microcontroller 40 controls the output terminal 42 to output a square wave. Signals different from those in a square wave are detected at the second detection terminal 44 and the third detection terminal 45. When the first detection terminal 43 detects signals different from those in a square wave, and the third detection terminal 45 detects signals different from those in a square wave, the microcontroller 40 determines that the state of the check circuit 82 is the output anomaly. When the first detection terminal 43 detects signals different from those in a square wave, and the second detection terminal 44 and the third detection terminal 45 detect signals different from those in a square wave, the microcontroller 40 may determine that the state of the check circuit 82 is the output anomaly. When the third detection terminal 45 detects signals different from those in a square wave, the microcontroller 40 may determine that the state of the check circuit 82 is the output anomaly.

Inter-Terminal Short-Circuit Anomaly

When the state of the check circuit 82 is the inter-terminal short-circuit anomaly, the first detection terminal 43 detects a non-inverted wave. When the state of the check circuit 82 is the inter-terminal short-circuit anomaly, the first high-voltage-side signal terminal 112 and the second high-voltage-side signal terminal 113 are short-circuited, or the first low-voltage-side signal terminal 122 and the second low-voltage-side signal terminal 123 are short-circuited. Thus, the square wave output from the output terminal 42 is input to the first detection terminal 43 via the short-circuited terminals without passing through the inverting circuit 88. Accordingly, when the state of the check circuit 82 is the inter-terminal short-circuit anomaly, the first detection terminal 43 detects a non-inverted wave. The same signal as the output of the output terminal 42 is detected at the second detection terminal 44 and the third detection terminal 45. When the output terminal 42 outputs a square wave, the square wave is input to the third low-voltage-side signal terminal 124 via the third connection line 98. Accordingly, a non-inverted wave is detected at the second detection terminal 44. Since the third detection terminal 45 is connected to the output terminal 42, the square wave output from the output terminal 42 is input to the third detection terminal 45. Accordingly, a non-inverted wave is detected at the third detection terminal 45. When detecting a non-inverted wave at the first detection terminal 43, the microcontroller 40 determines that the inter-terminal short-circuit anomaly is occurring. The microcontroller 40 may determine that the inter-terminal short-circuit anomaly is occurring when detecting a non-inverted wave at the first detection terminal 43 and the second detection terminal 44.

Advantages of Present Embodiment (1) The check circuit 82 includes the inverting circuit 88. In a case in which the connection state of the connectors is the normal connection, if the checking conductor 74 electrically connects the checking terminals 64, 65 to each other, a square wave is input to the inverting circuit 88. When the inverting circuit 88 inverts the square wave, an inverted wave is detected at the first detection terminal 43. When detecting the inverted wave at the first detection terminal 43, the microcontroller 40 determines that the conversion device-side connector 61 and the external connector 71 are connected to each other. The microcontroller 40 determines whether there is a non-connection anomaly based on the detection result of the first detection terminal 43. When the connection state of the connectors is the non-connection anomaly, the inverting circuit 88 does not receive a square wave. Thus, the inverting circuit 88 outputs high-level signals. When detecting high-level signals at the first detection terminal 43, the microcontroller 40 determines that the connection state of the connectors is the non-connection anomaly. The microcontroller 40 determines whether there is an inter-terminal short-circuit anomaly based on the detection result of the first detection terminal 43. When an inter-terminal short-circuit anomaly is occurring, a square wave output from the output terminal 42 is input to the first detection terminal 43 via the short-circuited terminals. Since the square wave output from the output terminal 42 is input to the first detection terminal 43 without passing through the inverting circuit 88, a non-inverted wave is detected at the first detection terminal 43. When detecting a non-inverted wave at the first detection terminal 43, the microcontroller 40 determines that there is an inter-terminal short-circuit anomaly. In this manner, the microcontroller 40 detects an inter-terminal short-circuit anomaly in the isolator 110 by detecting a signal input to the first detection terminal 43.

(2) The inverting circuit 88 includes the transistor 89. The isolator 110 and the checking conductor 74 are connected to each other via the transistor 89. Since the voltage applied to the isolator 110 is reduced, the withstand voltage of the isolator 110 is increased.

(3) The microcontroller 40 determines whether there is a power supply short-circuit anomaly based on the detection results of the first detection terminal 43 and the second detection terminal 44. When detecting low-level signals at the first detection terminal 43 and a non-inverted wave at the second detection terminal 44, the microcontroller 40 determines that there is a power supply short-circuit anomaly. The microcontroller 40 determines whether there is a ground short-circuit anomaly based on the detection results of the first detection terminal 43 and the second detection terminal 44. When detecting only high-level signals at the first detection terminal 43 and low-level signals at the second detection terminal 44, the microcontroller 40 determines that there is a ground short-circuit anomaly. This allows the microcontroller 40 to detect a power supply short-circuit anomaly and a ground short-circuit anomaly.

Modifications

The above-described embodiment may be modified as follows. The above-described embodiment and the following modifications can be combined if the combined modifications remain technically consistent with each other.

The isolator 110 does not necessarily need to include the fourth low-voltage-side signal terminal 125 and the fourth high-voltage-side signal terminal 115. In this case, a photocoupler is provided between the communication terminal 46 and the communication unit 102.

If the vehicle on-board power conversion device 30 is used in the vehicle 10, the vehicle on-board power conversion device 30 may be used in a device other than the vehicle on-board motor-driven compressor 20. Depending on the device in which the vehicle on-board power conversion device 30 is used, the power converter 32 may be changed to a main drive source inverter that drives a traveling motor or a DC/DC converter that converts a high voltage to a low voltage.

The external connector 71 may be a checking connector connected to a diagnostic tester for diagnosing abnormality of the vehicle on-board power conversion device 30 before the vehicle on-board motor-driven compressor 20 is shipped out of the factory.

The microcontroller 40 may be modified as long as it can detect at least the normal connection, the non-connection anomaly, and the inter-terminal short-circuit anomaly. In this case, the microcontroller 40 does not necessarily need to include the second detection terminal 44 or the third detection terminal 45.

The microcontroller 40 may be modified as long as it can detect at least one of the power supply short-circuit anomaly and the ground short-circuit anomaly. The expression "at least one" as used herein means "one or more" of desired options. As an example, the expression "at least one" as used herein means "only one option" or "both of two options" if the number of options is two. As another example, the expression "at least one" used herein means "only one option" or "a combination of any two or more options" if the number of options is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle on-board power conversion device, comprising:

a power converter that includes a switching element, a drive circuit that drives the switching element, and a microcontroller that controls the drive circuit, the power converter being configured to convert a power from a power supply using the switching element and supply the converted power to a load;

a case that accommodates the power converter;

a conversion device-side connector that is electrically connected to the power converter and is configured to be connected to an external connector electrically connected to the power supply; and a check circuit that is configured to check a connection state of the conversion device-side connector and the external connector, wherein the microcontroller includes:

an output terminal configured to output a square wave; and a detection terminal configured to detect the square wave, the conversion device-side connector includes two checking terminals configured to be connected to a checking conductor provided in the external connector, the output terminal and the detection terminal are electrically connected to the check circuit together with the two checking terminals and the checking conductor, the vehicle on-board power conversion device further comprises an isolator located between the check circuit and the microcontroller, the isolator being configured to transmit a signal including the square wave while insulating the check circuit and the microcontroller from each other, the isolator includes:

a first terminal that is electrically connected to the output terminal;

a second terminal that is electrically connected to the detection terminal;

a third terminal that is insulated from the first terminal and is electrically connected to a first checking terminal of the two checking terminals, and is configured to output the square wave transmitted from the first terminal; and a fourth terminal that is insulated from the third terminal and is electrically connected to a second checking terminal of the two checking terminals, and is configured to output the input square wave to the second terminal, the check circuit includes an inverting circuit located between the second checking terminal and the fourth terminal, the inverting circuit being configured to invert the signal including the square wave so as to generate an inverted wave, and the microcontroller is configured to determine that the conversion device-side connector and the external connector are connected to each other when detecting the inverted wave at the detection terminal in response to the checking conductor electrically connecting the two checking terminals to each other, determine whether there is any of multiple anomalies based on a detection result of the detection terminal, the anomalies including:

a non-connection anomaly, in which the conversion device-side connector and the external connector are not connected to each other; and an inter-terminal short-circuit anomaly, in which a short circuit is occurring between the first terminal and the second terminal or between the third terminal and the fourth terminal, and output an anomaly signal indicating which of the anomalies is occurring.

2. The vehicle on-board power conversion device according to claim 1, wherein the detection terminal is a first detection terminal, the microcontroller further includes a second detection terminal, the square wave passing through the isolator is divided between the third terminal and the first checking terminal and is input to the second detection terminal without passing through the inverting circuit, the isolator further includes:

a fifth terminal that is electrically connected to the second detection terminal; and a sixth terminal that is insulated from the fifth terminal and transmits the square wave output from the third terminal to the fifth terminal, the microcontroller is further configured to determine whether there is any of multiple anomalies based on detection results of the first detection terminal and the second detection terminal, the anomalies including:

a power supply short-circuit anomaly, in which the check circuit is short-circuited with a power supply that applies a voltage to the power converter; and a ground short-circuit anomaly, in which the check circuit is short-circuited with a ground of the power converter, and output the anomaly signal.

* * * * *